United States Patent
Quarto et al.

(10) Patent No.: US 10,638,296 B2
(45) Date of Patent: *Apr. 28, 2020

(54) METHODS AND SYSTEMS FOR PURCHASING, SHARING AND TRANSFERRING OWNERSHIP OF DIGITAL MUSIC USING AUTHENTICATED DATA FILES FROM NEAR FIELD COMMUNICATION (NFC) CHIPS

(71) Applicants: Bruce Quarto, Woodland Hills, CA (US); Chi Huynh, San Dimas, CA (US)

(72) Inventors: Bruce Quarto, Woodland Hills, CA (US); Chi Huynh, San Dimas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/375,270

(22) Filed: Apr. 4, 2019

(65) Prior Publication Data
US 2019/0230487 A1 Jul. 25, 2019

Related U.S. Application Data

(63) Continuation of application No. 14/917,053, filed as application No. PCT/US2015/063378 on Dec. 2, 2015, now Pat. No. 10,257,680.
(Continued)

(51) Int. Cl.
*H04B 5/00* (2006.01)
*H04W 4/00* (2018.01)
(Continued)

(52) U.S. Cl.
CPC .......... *H04W 4/80* (2018.02); *G06Q 20/1235* (2013.01); *G06Q 30/016* (2013.01);
(Continued)

(58) Field of Classification Search
CPC . H04W 4/00; H04W 4/80; H04B 5/00; H04B 5/0031; G06K 7/10
See application file for complete search history.

(56) References Cited

U.S. PATENT DOCUMENTS

| D182,205 S | 2/1958 | Schreiber |
| 4,080,803 A | 3/1978 | Suzuki |

(Continued)

FOREIGN PATENT DOCUMENTS

| CN | 102204516 B | 12/2012 |
| CN | 102332106 B | 1/2014 |

(Continued)

OTHER PUBLICATIONS

PCT/US2015/063378 International Search Report dated Feb. 12, 2016.
(Continued)

*Primary Examiner* — Blane J Jackson
(74) *Attorney, Agent, or Firm* — Wagenknecht IP Law Group PC

(57) ABSTRACT

Methods for sharing and transferring music files using near field communication (NFC), which include storing a playlist of music files on a server system and assigning the music files or the playlist to an NFC Identifier (NFC ID); receiving the NFC ID using an NFC enabled device and authenticating the received NFC ID with the server system using the NFC enabled device; and if authenticated, permitting the server system to share or transfer the music files for playing through the NFC enabled device.

15 Claims, 11 Drawing Sheets

Related U.S. Application Data

(60) Provisional application No. 62/086,384, filed on Dec. 2, 2014.

(51) Int. Cl.
| | | |
|---|---|---|
| *H04W 4/80* | (2018.01) | |
| *H04W 12/06* | (2009.01) | |
| *G06Q 30/00* | (2012.01) | |
| *H04W 12/00* | (2009.01) | |
| *G06Q 20/12* | (2012.01) | |
| *H04L 29/06* | (2006.01) | |
| *G06Q 30/06* | (2012.01) | |

(52) U.S. Cl.
CPC ......... *G06Q 30/018* (2013.01); *H04B 5/0031* (2013.01); *H04L 63/08* (2013.01); *H04W 12/003* (2019.01); *H04W 12/06* (2013.01); *G06Q 30/014* (2013.01); *G06Q 30/06* (2013.01); *H04B 5/0062* (2013.01); *H04L 2463/101* (2013.01); *H04W 12/00407* (2019.01)

(56) References Cited

U.S. PATENT DOCUMENTS

| | | |
|---|---|---|
| 4,608,838 A | 9/1986 | Gardner |
| 6,868,804 B1 | 3/2005 | Huisma et al. |
| 7,596,967 B2 | 10/2009 | Ostfeld |
| 7,962,369 B2 | 6/2011 | Rosenberg |
| 7,980,469 B2 | 7/2011 | Matsuo |
| D647,419 S | 10/2011 | Wong |
| 8,131,645 B2 | 3/2012 | Lin |
| D662,437 S | 6/2012 | Verdeille |
| 8,240,568 B2 | 8/2012 | Matsuo |
| 8,280,305 B2 | 10/2012 | Tamura |
| D675,952 S | 2/2013 | Dholakiya |
| D680,023 S | 4/2013 | Ho |
| 8,768,250 B2 | 7/2014 | Ma |
| 8,942,672 B2 | 1/2015 | Renard |
| D727,200 S | 4/2015 | Kwon |
| 9,042,817 B2 | 5/2015 | Tse |
| 9,082,267 B2 | 7/2015 | Rosenberg |
| 9,092,813 B2 | 7/2015 | Pappas |
| D754,025 S | 4/2016 | Baid |
| 9,444,524 B2 | 9/2016 | Huynh |
| 9,456,063 B2 | 9/2016 | Mercando et al. |
| 9,489,612 B2 | 11/2016 | Boulby |
| D786,119 S | 5/2017 | Huynh |
| 9,824,310 B2 | 11/2017 | Huynh |
| 10,108,900 B2 | 10/2018 | Huynh |
| 10,257,680 B2 | 4/2019 | Quarto et al. |
| 10,317,940 B2 | 6/2019 | Eim et al. |
| 2004/0112087 A1 | 6/2004 | Bishop |
| 2004/0250570 A1 | 12/2004 | Huynh |
| 2007/0288249 A1 | 12/2007 | Rowe et al. |
| 2008/0015013 A1 | 1/2008 | Gelman et al. |
| 2008/0016913 A1 | 1/2008 | Ray et al. |
| 2010/0147226 A1 | 6/2010 | Tsengas |
| 2011/0248088 A1 | 10/2011 | Edouard et al. |
| 2012/0215935 A1 | 8/2012 | Woods |
| 2012/0218184 A1 | 8/2012 | Wissmar |
| 2012/0242481 A1 | 9/2012 | Gemandt et al. |
| 2012/0256729 A1* | 10/2012 | Kang ............... G06Q 10/00 340/10.1 |
| 2013/0011025 A1 | 1/2013 | Liu et al. |
| 2013/0203346 A1* | 8/2013 | Han ............... H04M 1/7253 455/41.1 |
| 2013/0234899 A1 | 9/2013 | Pope et al. |
| 2013/0254159 A1 | 9/2013 | Thramann et al. |
| 2014/0102136 A1 | 4/2014 | Warren |
| 2014/0116085 A1 | 5/2014 | Lam |
| 2014/0195675 A1 | 7/2014 | Silver |
| 2014/0198037 A1 | 7/2014 | Leica et al. |
| 2014/0292477 A1 | 10/2014 | Ahmadloo |
| 2014/0298434 A1 | 10/2014 | Prchal |
| 2015/0026296 A1 | 1/2015 | Halpern |
| 2015/0042450 A1 | 2/2015 | McLear |
| 2015/0134552 A1 | 5/2015 | Engels |
| 2015/0140927 A1 | 5/2015 | Chen |
| 2015/0206046 A1 | 7/2015 | Aibazov |
| 2015/0213734 A1 | 7/2015 | Glickman |
| 2015/0220109 A1 | 8/2015 | von Badinski et al. |
| 2015/0249485 A1 | 9/2015 | Ouyang et al. |
| 2015/0256386 A1 | 9/2015 | Palmer |
| 2015/0263791 A1 | 9/2015 | Chein |
| 2015/0294214 A1 | 10/2015 | Boulby |
| 2015/0349556 A1 | 12/2015 | Mercando et al. |
| 2016/0020833 A1 | 1/2016 | Ting |
| 2016/0064804 A1 | 3/2016 | Kim et al. |
| 2016/0066812 A1 | 3/2016 | Cheng et al. |
| 2016/0110639 A1 | 4/2016 | Finn et al. |
| 2016/0112097 A1 | 4/2016 | Huynh |
| 2016/0125209 A1 | 5/2016 | Meyers |
| 2016/0196487 A1 | 7/2016 | Huynh |
| 2017/0277990 A1 | 9/2017 | Tokunaga et al. |
| 2018/0219279 A1 | 8/2018 | Beaucourt et al. |
| 2018/0310152 A1 | 10/2018 | Huynh |
| 2019/0053055 A1 | 2/2019 | Neyrou et al. |
| 2019/0197385 A1 | 6/2019 | Finn et al. |

FOREIGN PATENT DOCUMENTS

| | | | |
|---|---|---|---|
| GB | 2559621 A | 8/2018 | |
| JP | 2005242744 A * | 9/2005 | ............ G06K 17/00 |
| JP | 2007-091453 A | 12/2007 | |
| JP | 3176725 U | 7/2012 | |
| KR | 20030039941 | 5/2003 | |
| WO | 2005015986 A2 | 2/2005 | |
| WO | 2014016609 A1 | 1/2014 | |
| WO | 2016/089965 A1 | 6/2016 | |
| WO | 2017/180099 A1 | 10/2017 | |
| WO | 2019032617 A1 | 2/2019 | |

OTHER PUBLICATIONS

PCT/US2018/045665 International Search Report and Written Opinion dated Oct. 24, 2018.
PCT/US2016/027055 International Search Report and Written Opinion dated Jun. 30, 2016.
JP2014-230581 Office Action dated Jan. 7, 2016.
http://mdcdiamonds.com/images/ProductImages/ES838wg-1.jpg. Retrieved Jun. 8, 2016.

* cited by examiner

METHODS AND SYSTEMS FOR PURCHASING, SHARING AND TRANSFERRING OWNERSHIP OF DIGITAL MUSIC USING AUTHENTICATED DATA FILES FROM NEAR FIELD COMMUNICATION (NFC) CHIPS

CROSS REFERENCE TO RELATED APPLICATIONS

This is a continuation application of U.S. patent application Ser. No. 14/917,053, filed Mar. 7, 2016, which is a national phase application under 35 U.S.C. § 371 of international patent application serial no. PCT/US15/063378, filed Dec. 2, 2015, which claims benefit of priority to U.S. patent application Ser. No. 62/086,384 filed Dec. 2, 2014, the content of all foregoing patent applications are herein incorporated by reference in their entireties.

TECHNICAL FIELD

The invention relates to the use of near field communication (NFC) technology for the transfer of data files between mobile devices and more specifically to authenticating the purchase, share and ownership transfer of music files using near field communication chips.

BACKGROUND OF THE INVENTION

Since the emergence of Internet file sharing, the music industry has been experimenting with new models of distributing music. Before the invention of the music download, the music industry went through phases of distributing music through physical exchange of media, such as the 8-track, the vinyl, the cassette, and the CD. Today, with the emergence of electronic music purchasing services, purely digital transfer of music dominates music distribution. Physical storefronts selling music embodied on physical media have become rare and exist mostly as specialty shops for music enthusiasts.

In the past, borrowing and giving music as a gift was easy. Individuals could merely give or borrow the physical media. However, it is more problematic with digital music files since the digital media can be easily reproduced and transferred to multiple different individuals. To this end, encryption systems for preventing the transfer of music files is has been adopted, but these systems suffer from a drawback in that they do not provide a convenient system for temporarily sharing music and options to purchase shared music. As such, there remains a need for a middle ground that permits a user to temporarily share a music file with another while still maintaining control over its reproduction and further distribution and which provides the borrower the opportunity to conveniently purchase the same music.

SUMMARY OF THE INVENTION

The above challenges are addressed by the methods and devices of the present invention. In one aspect of the invention a method for transferring music files using near field communication (NFC) to an initial purchaser is provided, the method including: providing an NFC chip with an NFC identifier (ID) unique to the NFC chip; assigning a group of music files to an NFC ID and purchase code pair, where the NFC ID and purchase code pair are stored on a server system configured to access and transfer the music files; reading the NFC ID from the NFC chip using an NFC enabled device loaded with music sharing software configured to play the music files; entering the purchase code into the NFC enabled device; authenticating the NFC ID and purchase code pair received by the NFC enabled device through communication with the server system; and if authenticated registering the music files to a user of the NFC enabled device. Once the music files are registered, the user is permitted to download the music files to the NFC enabled device for playing the downloaded music files or may play the music files by saving the music files to a registered account and playing the music files remotely from the account using the NFC enabled device. In some embodiments playing files remotely is performed using streaming technology. Further, once registered the user may designate other users for receiving temporary access to stream copies of the music files, which is regulated and monitored by the server system.

The NFC chip is preferably provided in a form that facilitates physical exchange while protecting the NFC chip itself from damage. In some embodiments, the NFC chip is housed in a polymer and shaped to form an NFC bead.

In some embodiments the purchase code is preloaded on the NFC chip. In such embodiments the NFC chip is offered in packaging, which includes a metallic wrap that prevents near field communication with the NFC chip. However, in preferred embodiments the purchase code is not communicated using near field technology and thus not preloaded on the NFC chip. In some embodiments the purchase code is entered into the music sharing software by the user, such as typing a data string of numbers, letters and symbols through a user interface on the NFC enabled device.

In preferred embodiments the music files are stored in a database within the server system together with the purchase code. The server system can also store a device ID unique to the NFC enabled device permitted to play the music files and the NFC ID.

In a related aspect, the invention also provides a method of playing music files using near field communication (NFC), the method including: providing an NFC enabled device loaded with music sharing software and an accessible playlist of music files from an accessible library of music files, where the playlist is assigned to a playlist identifier (playlist ID) that is encoded on an NFC chip; establishing near field communication between the NFC enabled device and the NFC chip to receive the playlist ID from the NFC chip to the NFC enable device; and playing the playlist on the NFC enabled device in response to receiving the playlist ID from the NFC chip.

In some embodiments a plurality of playlists are accessible by the NFC enabled device, where each playlist within the plurality of playlists is assigned to a unique playlist ID. In some embodiments the playlist of music files and library of music files are stored on the NFC enabled device. In other embodiments the playlist of music files are stored on the NFC enabled device and fewer than all of the accessible library of music files accessible by the NFC enabled device are stored on the NFC enabled device. In other embodiments, the playlist of music files and library of music files are stored on a server system in a user account that is accessible by the user with the NFC enabled device. Preferably, the NFC enabled device is registered within the user account to permit access to the library of music files. The NFC enabled device is able to distinguish between playlists by the unique playlist IDs and thus a plurality of NFC chips can be provided, each encoded with a different playlist ID for launching a different playlist or music files.

In another related aspect the invention provides a method of sharing a music playlist using near field communication (NFC), the method including: assigning a playlist Identifier (playlist ID) to a playlist of music files; receiving an NFC Identifier (NFC ID) from an NFC chip using an NFC enabled device; writing the playlist ID to the NFC chip using the NFC enabled device; storing the NFC ID and playlist ID to a server system, where the server system has an accessible copy of the music files encoded in the playlist ID for streaming; receiving the NFC ID and playlist ID using a subsequent NFC enabled device; authenticating the received NFC ID and playlist ID on the subsequent NFC enabled device with the server system; and if authenticated, streaming the copy of the music files through the subsequent NFC enabled device. The playlist ID can be generated and assigned by the NFC enabled device for writing to the NFC chip and for transmitting to the server system. Alternatively, the server system can generate and assign the playlist ID then provide the playlist ID to the NFC enabled device for writing to the NFC chip.

The NFC chip is preferably provided in a form that facilitates physical exchange while protecting the NFC chip itself from damage. In some embodiments, the NFC chip is housed in a polymer to form an NFC bead.

The sharing feature does not transfer ownership of music files but instead only permits limited access to the server system for streaming the music files without permitting the download of the music files into memory of the subsequent NFC enabled device for further replaying. In some embodiments the music file for streaming is a shortened file shorter than the original music file but in other embodiments the music file for streaming is a full length file. Limiting access to streaming the music file(s) can be in performed using different approaches. In some embodiments the streaming is limited to a predetermined time. In such instances, the server system may provide access to streaming the files only over a predefined period of time. After the predefined time expires permission to stream the music files is automatically revoked. Alternatively, the server system may provide access to play the files over a predetermined repetition, where music files within the playlist may only be played a predetermined number of times before the permission to play the music files is automatically revoked. In some embodiments, the sharing feature also presents an option for the subsequent user to purchase one or more of the music files within the playlist after the NFC ID and playlist ID are authenticated.

In another related aspect, the invention provides a method of transferring music files between users with near field communication (NFC) enabled devices, the method including: providing an NFC enabled device with a library of music files; registering an NFC ID, a purchase code, and music files from the library of music files to a user account on a server system; reading the NFC ID from an NFC chip using a subsequent NFC enable device; entering the purchase code into the subsequent NFC enable device without use of the NFC chip; authenticating the NFC ID and purchase code on the server system; requesting permission to transfer the music files from the user's account to a different user's account; and if approved, deleting the music files from the library of music files; registering the purchase code and music files to the different user's account; and optionally downloading the music files to the subsequent NFC enable device.

Once the music files are transferred away from the initial user, the music sharing software can provide additional options to the user. In some embodiments a selectable option is provided, which permits the initial user to stream a copy of deleted music files. In such instances, the streaming or playable files may be shortened files that are shorter than the original music files, may be streamed temporarily, or both. When presenting such selectable options, their display may be different than owned music files within the library of music files to emphasize the difference in ownership. A first display characteristic can be used to characterize an owned music file as available for play from the library of music files, and a second display characteristic can be used to characterize the copy of a deleted music file as only available for streaming or playing without downloading into memory for replaying. The different display characteristics can be different background shading, different colored fonts, different identifiable symbols or other identifiers visually apparent to the viewer. In addition, after transfer of ownership the music sharing software presents a selectable option to repurchase a copy of deleted music files through the server system.

The NFC chip is preferably provided in a form that facilitates physical exchange while protecting the NFC chip itself from damage. In some embodiments, the NFC chip is housed in a polymer to form an NFC bead.

In another related aspect, the invention provides a method of transferring music files between near field communication (NFC) enabled devices, the method including: providing an NFC enabled device loaded with a library of music files and an NFC chip encoded with an NFC identifier (NFC ID); generating a playlist of music files from the library of music files; assigning a playlist ID, a transfer code, and the NFC Identifier to the playlist on a server system; saving the playlist ID to the NFC chip; receiving the playlist ID from the NFC chip using a subsequent NFC enabled device; entering the transfer code into the subsequent NFC enabled device; authenticating the NFC ID, playlist ID and transfer code on the server system; sending a permission request from the server system to the NFC enabled device to confirm transfer of the music files to a subsequent user; and if approved deleting the music files from the library of music files; and registering the music files to the subsequent user's account, where the registration updates ownership of the music files.

Once the music files are transferred away from the user, the music sharing software can provide additional options to the user. In some embodiments a selectable option is provided, which permits the user to stream but not download a copy of deleted music files. In such instances, the streaming files may be shortened files that are shorter than the original music files, may be streamed temporarily, or both. When presenting such selectable options, their display may be different than music files within the library of music files to emphasize the difference in ownership. A first display characteristic can be used to characterize a music file as available for play from the library of music files stored in long term memory, and a second display characteristic can be used to characterize the copy of the deleted music file as only available for streaming. The different display characteristics can be different background shading, different colored fonts, different identifiable symbols or other identifiers apparent to the viewer. In addition, after transfer of ownership the music sharing software presents a selectable option to repurchase a copy of deleted music files through the server system.

The NFC chip is preferably provided in a form that facilitates physical exchange while protecting the NFC chip itself from damage. In some embodiments, the NFC chip is housed in a polymer to form an NFC bead.

In another related aspect, the invention provides a near field communication chip encoded with a playlist ID associated with a playlist of music files, where the playlist ID is in a form that is readable by an NFC enabled device loaded with music sharing software for playing the playlist of music files. In a preferred embodiment the NFC chip is provided in a form that facilitates physical exchange while protecting the NFC chip itself from damage. In some embodiments, the NFC chip is housed in a polymer to form an NFC bead.

In another related aspect, the invention provides a near field communication (NFC) enabled device loaded with music sharing software, where the music sharing software includes: NFC programming configured to receive data files from NFC chips and to write data files to NFC chips; a music player for playing music files; programming to populate one or more databases with NFC IDs assigned to NFC chips and playlist identifiers (playlist IDs) assigned to playlists of music files; query programming to compare received NFC IDs and received playlist IDs to the one or more databases; and if a pair is authorized, launching a playlist assigned to a received playlist ID; and communication programming for communicating with a server system to update playlist IDs and NFC IDs. In some embodiments the music sharing software generates playlists and assigns playlist IDs to playlists. Playlist IDs can be generated using data from each music file to generate a data string that itself can be decoded through comparison to the music files. In such embodiments, the software can retrieve code from each music file and order the retrieved code according the order of the playlist. Alternatively, the software can include a random data string generator that generates a string of data comprising a random order of numbers, letters and symbols. In such embodiments a playlist data file may also be generated for decoding the playlist for transfer to the server system.

BRIEF DESCRIPTION OF THE DRAWINGS

Embodiments of the invention can be better understood with reference to the following drawings, the text within each is incorporated into the description of embodiments within the invention. The components in the drawings are not necessarily to scale, the emphasis instead being placed upon illustrating the principles of the invention.

FIG. 2A is an NFC bead activation screen 202 prompting for entry of a purchase code. FIG. 2B is a successful activation screen 204, which is shown after activation or registration of the NFC bead and purchase code. FIG. 2C is a music file screen 206, which is shown while playing a music file. FIG. 2D is a playlist generation screen 208 indicating which music files will be added to a playlist for sharing. FIG. 2E depicts a syncing screen 210, which instructs the music sharing software to write a playlist ID to the NFC bead. FIG. 2F is a social media screen 212 permitting the user to choose a social media platform to share a preview of a music file. FIG. 2G is a preview screen 214 providing a user the option to share a playable preview of a music file or purchase the music file from the server system.

DETAILED DESCRIPTION

Figure 1A:
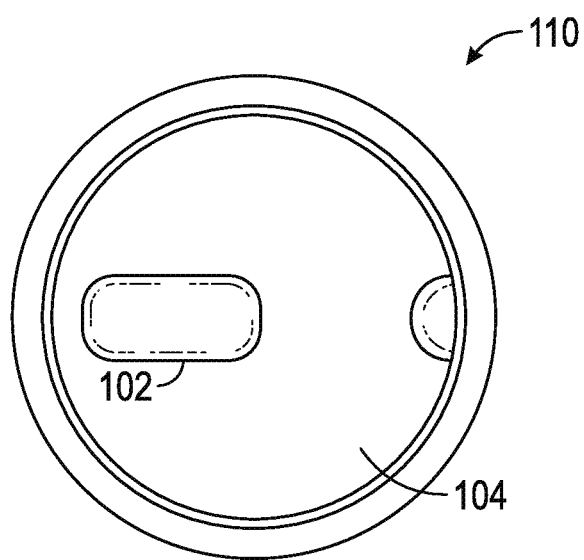
FIG. 1A is a cutaway of an NFC bead 110 showing the NFC chip 102 housed within a protective coating 104.

For clarity of disclosure, and not by way of limitation, the invention is discussed according to different detailed embodiments; however, the skilled artisan will recognize through the guidance herein that features of one embodiment can be combined with other embodiments and therefore such combinations are within the intended scope of the invention.

The music sharing software in this patent application is subject to copyright protection under the copyright laws of the United States and of other countries. As of the effective filing date of this application, the material is protected as unpublished material. Permission to copy this material is hereby granted to the extent that the owner of the copyright has no objection to the facsimile or reproduction of the patent document or disclosure as it appears in the United States Patent and Trademark Office patent file or records or of any Patent Office file or records. The copyright owner otherwise reserves all copyright works whatsoever.

Unless defined otherwise, all technical and scientific terms used herein have the same meaning as is commonly understood by one of ordinary skill in the art to which this invention belongs. If a definition set forth in this document is contrary to or otherwise inconsistent with a definition set forth in the art, the definition set forth in this document prevails over a contradictory definition.

The term "NFC chip" as used herein refers to an unpowered integrated circuit capable of near field communication and capable of storing data into memory and having an antenna for electric field modulation. NFC chips are capable of communicating with NFC enabled mobile devices.

The term "housed NFC chip" as used herein refers to an NFC chip positioned within a protective covering, where the protective covering does not prevent near field communication between the NFC chip and an NFC enabled device. The housed NFC chip requires power from an NFC enabled device for near field communication.

The term "NFC bead" as used herein refers to a generally spherical or tear drop shaped housing having an embedded NFC chip, which is capable of communicating with an NFC enabled device. An "NFC bead" is an ornamental variation of a housed NFC chip.

The term "NFC enabled device" as used herein refers to an electronic device having near field communication software and hardware for powering NFC chips, transmitting data files to NFC chips and receiving data files from NFC chips.

The term "software" as used herein refers to a set of instructions that direct the NFC enabled device to perform specific operations. The term "software" is intended to encompass computer programs, libraries and related non-executable data.

The term "system server" as used herein refers to a system including a computer loaded with computer server software and accessible over a computer network, where the system server manages network resources, such as by storing files, processing database queries, or managing network traffic. The system server includes any external and internal databases, memory, and processors.

The term "user ID" as used herein refers to an identifier used by an individual to identify who owns the music file or playlist.

The term "purchase code" as used herein refers to a code that allows a set of files to be downloaded from a system server onto a user's NFC enabled device.

The term "NFC identifier" or "NFC ID" as used herein refers to an identifier used by the music sharing software and the server system to identify one NFC chip from another.

The term "device identifier" or "device ID" as used herein refers to an identifier code used to capture the identity of the NFC enabled device.

The term "playlist identifier" or "playlist ID" as used herein refers to an identifier code used to identify a group of music files.

The term "share" or "sharing" refers to providing access to another user for playing or streaming a copy of a music file that is owned by the user. By "sharing" it is meant that limited access to a music file is granted, which is regulated by a server. By "sharing" it is meant that the "shared music file" cannot be downloaded into long term memory by another for later replay. "Sharing" may use streaming technology, which transfers data so that it can be processed as a steady and continuous stream and not stored in long long-term memory of the NFC enabled device. "Sharing" may be by providing limited access to a portal that permits temporary playing of music files without permitting downloading of the music files into long term memory on an NFC enabled device.

The term "copy of the music file" as used herein refers to an identical or similar version of a music file that is previously owned and need not be the same actual music file.

The term "downloading" as used herein refers to receiving a whole data object from a server system for local storage and later use.

The term "long-term memory" as used herein refers to memory within an NFC-enabled device that permits a music file to be accessible for playing anytime by the NFC-enable device and without limit to time, repetition, or access to the internet.

Figure 1B:
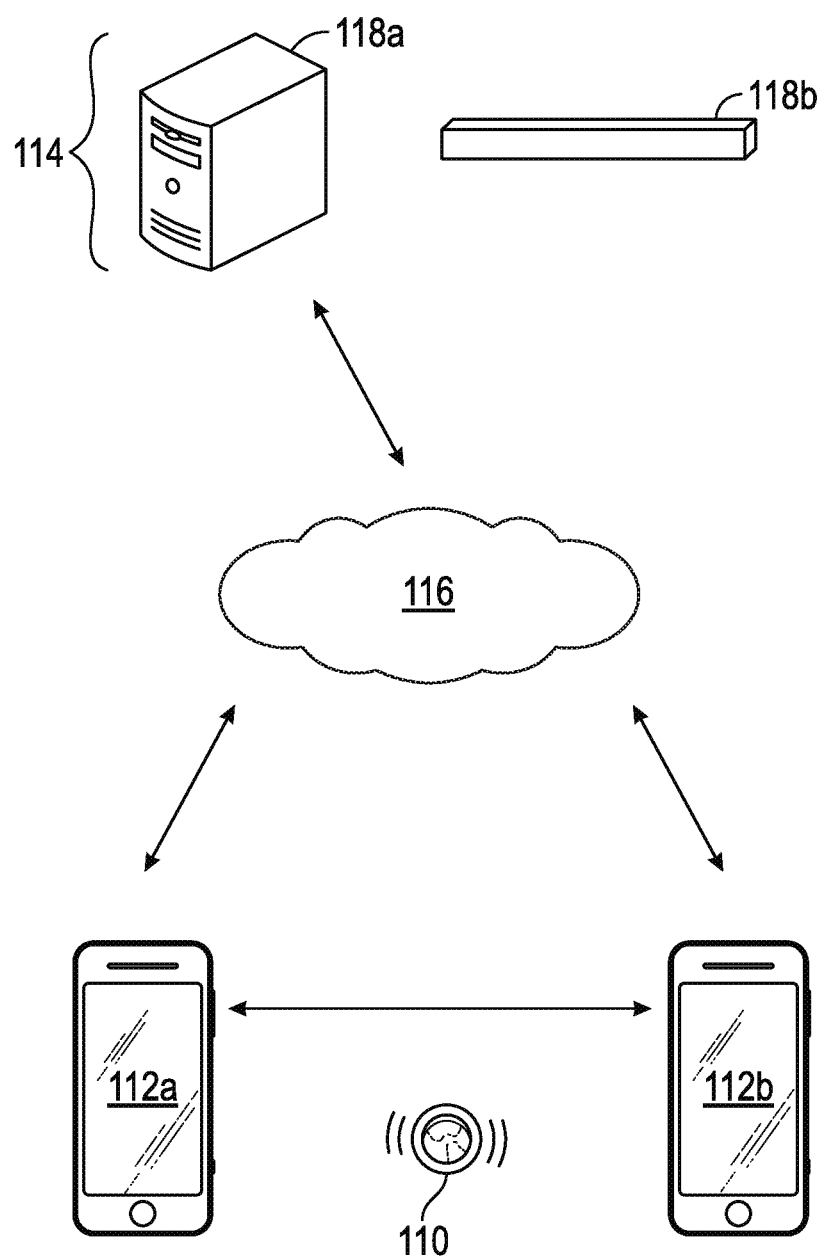
FIG. 1B is a flowchart depicting an NFC bead 110 used for communication between two NFC enabled devices 112a, 112b. In particular the flowchart depicts transfer of data files between an original purchaser's NFC enabled device 112a with a server system 114 over the Internet 116, the physical transfer of the NFC bead 110 to transfer data to a subsequent user's NFC enabled device 112b, and authentication of data received from the NFC bead 110 between the subsequent user's NFC enabled device 112b with the server system 114 over the internet 116. Also shown is a server 118a and database 118b within the server system 114 for communications function and storing identifiers, security codes, music files and other data files.

FIGS. 1A-B depict an introduction to the invention, which provides systems and methods for purchasing and sharing music files using NFC technology. The systems and methods combine a housed NFC chip 102, preferably embodied as a NFC bead 110, which is provided in a form for physical exchange between individuals; and NFC enabled devices 112a, 112b loaded with music sharing software, each capable of wirelessly communicating with a server system 114, which itself is capable of storing and streaming music files. The server system 114 is capable of transferring music files for playing/streaming and/or providing a portal to play music files with NFC enable devices 112a, 112b, without permitting downloading of the music files into memory for later use. In such a system the housed NFC chip 102 or NFC bead 110 communicates with NFC enabled devices 112a, 112b which in turn communicate with a server system 114, such as a server 118a over the Internet 116 and where the server 118a has access to one or more databases 118b storing music files for temporary sharing and corresponding security codes for authentication. Authentication is performed in part by transmitting an NFC identifier together with a playlist identifier between NFC enabled devices 112a, 112b using the housed NFC chip 110 as a medium of exchange. Since the music sharing software from an original purchaser's NFC enabled device 112a uploads the shared NFC identifier and playlist identifier to the server system 114, subsequent authentication of the identifiers can be accomplished by the server system 114 when provided by subsequent NFC enabled devices 112b. To this end, the systems and methods permit downloading music files to NFC enabled devices 112a of confirmed purchasers, generating playlists from purchased music files on NFC enabled devices 112a of confirmed purchasers, and temporarily sharing playlists of music files with NFC enable devices 112b of others in part through exchange of the housed NFC chip 102. The above is often accomplished through encoding and transferring a playlist identifier on a housed NFC chip 102 and notifying the server system 114 of the NFC identifier and playlist identifier, which maintains the music file during the sharing process for streaming. The systems and methods also provide for the purchase of music files from the shared playlist, and for the transfer of ownership of the originally shared music file.

In one aspect of the invention, a near field communication (NFC) chip 102 encoded with a playlist ID assigned to a playlist of music files is provided where the playlist ID is in a form that is readable by NFC enabled devices 112a, 112b loaded with music sharing software. As shown in FIG. 1A, the NFC chip 102 is preferably housed in a protecting layer 104, most preferably a polymer. As shown in FIG. 1B it is preferably shaped for improved ornamentation to form an NFC bead 110. Preferably, the NFC enabled devices 112a, 112b are embodied as mobile phones loaded with near field communication software, near field communication hardware, and music sharing software. The server system 114 is preferably a conventional computer server 118a loaded with server software and configured for hosting user accounts and for hosting a plurality of music files available for streaming, purchasing, and downloading such as through use of a database 118b, which can be internal or external to the server 118a.

Near field communication (NFC) is a more finely honed version of radio frequency identification (RFID). It operates within a maximum range of about 4-10 cm and can operate in one- or two-way communication. NFC communication involves the modulation of an electric field or a magnetic field to power a circuit in the form of the NFC chip 102 that in the case of the invention is not itself separately powered. To this end, bringing the housed NFC chip 102 against or in close proximity, such as within about 4 cm, 5 cm, 6 cm, 7 cm, 8 cm, 9 cm or 10 cm to the NFC enable device 112a, 112b powers the housed NFC chip 102 and thus permits the transfer of data between the housed NFC chip 102 and NFC enabled device 112a, 112b. Unlike technologies such as Bluetooth, discovery or pairing of a housed NFC chip 102 and an NFC enabled device 112a, 112b does not require any manual pairing or device discovery. Instead, the housed NFC chip 102 and NFC enabled device 112a, 112b will instantly communicate once the housed NFC chip 102 is brought into close proximity to the NFC enabled device 112a, 112b.

NFC chips 102 themselves are currently available through a variety of manufactures. The NFC chips 102 are small, fragile, and therefore at risk of loss or breakage. As such, the NFC chip 102 is housed in a form that reduces risk of loss, breakage and facilitates physical exchange between individuals. The housed NFC chip 102 can be housed in a variety forms such as a sphere, a card, a figurine, or any ornamental physical form that a person might want to physically exchange with another so long as the form does not prevent near field communication between the housed NFC chip 102 and the NFC enabled device 112a, 112b. For example, encircling an NFC chip 102 within a metallic shell could disrupt near field communication between the housed NFC chip 102 and the NFC enable device 112a, 112b and thus should be avoided without modification to permit near field communication. As another example, the surrounding shell should not be overly thick such as to prevent near field communication with the housed NFC chip 102. In a preferred embodiment, the NFC chip 102 is encased in a polymer shell as protective covering 104 and shaped to form the desired ornamentation. This can be accomplished using injection-molding techniques with suitable polymers, such as polypropylenes, polystyrenes, polyethylenes and others known in the polymer and plastic fabrication arts. For example, a polymer can be polymerized around the NFC chip 102 to form a polymer shell or the polymer shell can be formed then bored or drilled to permit insertion of the NFC chip 102. While metals and metal alloys can be incorporated into the housing, testing should follow to ensure near field communication can be maintained between the housed NFC chip 102 and NFC enable devices 112a, 112b as the inventors have found that metals and metal alloys in some housings can interfere with the near field communication.

Housed NFC chips 102 are distinguishable from others by an NFC identifier, also referred to as an NFC ID. The NFC ID is a string of numbers, letters, or symbols specific to the housed NFC chip. The NFC ID can be written to the NFC chip 102 in a form that cannot be changed or can be generated and written to the NFC chip 102 in a form that can be rewritten. In some embodiments the NFC chip 102 has permanent NFC ID that cannot be rewritten and a temporary NFC ID that can be rewritten. In instances where the NFC ID can be rewritten, preferably it can be rewritten using the music sharing software loaded on the NFC enabled device. This permits the user to create vanity NFC beads 110.

Since the housed NFC chip 102 itself is not separately powered, but instead is powered by the electric field generated by the NFC enabled device 112a, 112b, security features are provided to prevent others from retrieving data for downloading music files prior to purchase of the NFC chip 102. That is, since the housed NFC chip 102 is suitable for retail sale an NFC enabled device 112a, 112b positioned in close proximity to the NFC chip 102 during the distribution chain or when viewing by potential purchasers, might retrieve data from the NFC chip 102 prior to purchase and thus illegally obtain music files. To this end additional security features have been developed to protect the distribution of music files.

One solution to the challenge of preventing the unauthenticated downloading of music is to require the registration of the housed NFC chip 102 before use with a playlist. This can be performed by registering the NFC ID associated with each housed NFC chip 102. The music sharing software provides an option for activating newly acquired NFC chips 102, which can involve transferring the NFC ID to the server system 114 from an approved NFC enabled device 112a, 112b and/or approved user for insertion into the database.

Another solution to the challenge of preventing the unauthenticated downloading of music in a housed NFC chip 102 prior to purchase is to require a purchase code separate from the NFC chip 102. That is while an NFC chip 102 may be preloaded with an NFC ID and optionally a playlist ID associated with one or more music files, downloading the music files is prevented without separate entry of the purchase code. Even in instances where an NFC ID and playlist ID are presented to the server system 114, without prior registration of the NFC ID and/or playlist ID using a purchase code the NFC ID and playlist ID will not authenticate. In some embodiments, the server system 114 will not permit the subsequent registration of a previously registered NFC chip 102 or subsequent downloading of previously downloaded music files without additional confirmation or authorization from the registered owner.

In some embodiments, the purchase code is provided in a form that is not initially written to the housed NFC chip 102. For example, a purchase code can be type written separately on an insert, which requires the user to manually enter the purchase code into the music sharing software application after establishing near field communication with the NFC chip 102. The music sharing software application can then transfer the purchase code to the server system 114 for authentication. Authentication can involve a number of further authenticating steps such as counting and regulating the number of times a purchase code or NFC ID can been submitted.

In other embodiments, the purchase code is activated at the point of sale and thus could be provided separate from the housed NFC chip 102 or loaded on the housed NFC chip 102. In such embodiments, cashier terminal can act as a conduit to communicate with the server system 114, such as over the Internet 116, to exchanged data and thus activate the purchase code. In some embodiments the purchase code is written to the housed NFC chip 102 at the point of sale. Afterwards the purchaser can follow the downloading instructions, which are generally displayed in the music sharing software application.

In still other embodiments the purchase code is preloaded in the housed NFC chip 102 but the housed NFC chip 102 is stored in packaging that prevents near field communication between the housed NFC chip 102 and NFC enabled devices 112a, 112b. This can be accomplished by providing packaging having a metallic layer or film in a configuration that prevents near field communication between the housed NFC chip 102 and the NFC enable device 112a, 112b only when packaged. In some embodiments, the packaging is a metal or metal alloy entirely encapsulating the housed NFC chip 102. In other embodiments, the packaging includes a metal or metal alloy material configured as a 360 degree strip surrounding the housed NFC chip 102 to prevent near field communication between the NFC chip 102 and an NFC enabled device 112a, 112b until its unpacking. In some embodiments the NFC chip 102 is spherically surrounded by metal or metal alloy to prevent near field communication prior to unpacking the NFC chip 102 or NFC bead 110 from its packaging. Nonlimiting examples of metals and metal alloys that can be used include various electrically conductive materials such as steels, iron, silver, and gold. In these embodiments, the packaging must be disrupted to break its blocking effect or the housed NFC chip 102 removed from the packaging.

In a related aspect the invention provides a near field communication (NFC) enabled device 112a, 112b loaded with music sharing software. The music sharing software includes: NFC programming configured to receive data files from NFC chips 102 and to write data files to NFC chips 102; a music player in the form of an audio player for playing music files; programming to populate one or more databases with NFC IDs assigned to NFC chips 102 and playlist IDs assigned to playlists of music files; query programming to compare received NFC IDs and received playlist IDs to the one or more databases; and if a pair is authorized, launching a playlist assigned to a received playlist ID; and communication programming for communicating with a server system to update playlist IDs and NFC IDs.

FIGS. 2A-2G are screen shots depicting the graphical user interface on a mobile phone loaded with the music sharing software. The music sharing software may be used on a variety of operating systems by modifications consistent with the particular operating system. Such modifications are known to those of ordinary skill in the art to which the invention belongs. To this end, the music sharing software is provided in a way to guide the artisan on essential and optional functions to be carried out with additional reference to the drawings. As further nonlimiting guidance, systems of the invention may use java, PHP, Python, and SQL.

While the artisan could interface the music playing software with near field communication software already on the NFC enabled device, the music sharing software itself incorporates near field communication software for improved integration with the systems and methods. The NFC programming is set of code that receives data files from NFC chips and writes data files to NFC chips. Software applications are available commercially that themselves generate the NFC programming and thus may vary from application to application. To this end, these software applications can be used to generate the NFC programming module for the particular operating system.

In some embodiments once the NFC chip is powered, data encoded on the NFC chip is immediately discovered and the music sharing software unpacks the data. The skilled artisan will recognize that the differences in unpacking can depend on the programming of the NFC chip itself. Once unpacked the music sharing software reads the unpacked data and performs a series of operations depending on the data received and whether or not the NFC ID and/or playlist ID is already stored within the NFC enabled device and/or server system.

Figure 2B:
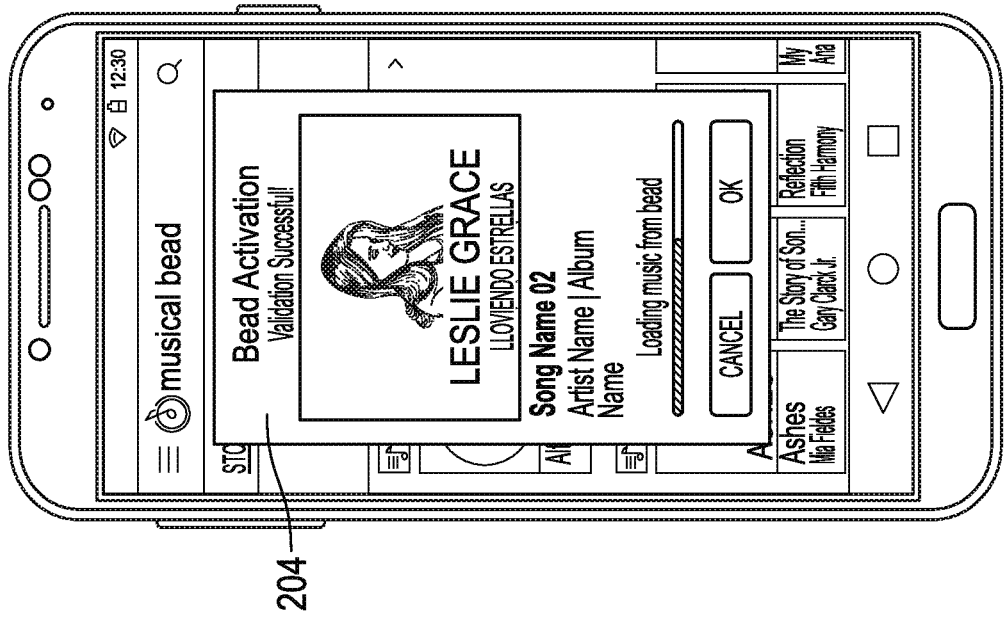
FIGS. 2A-2G are screen shots taken from a mobile phone loaded with music sharing software.
Figure 2A:
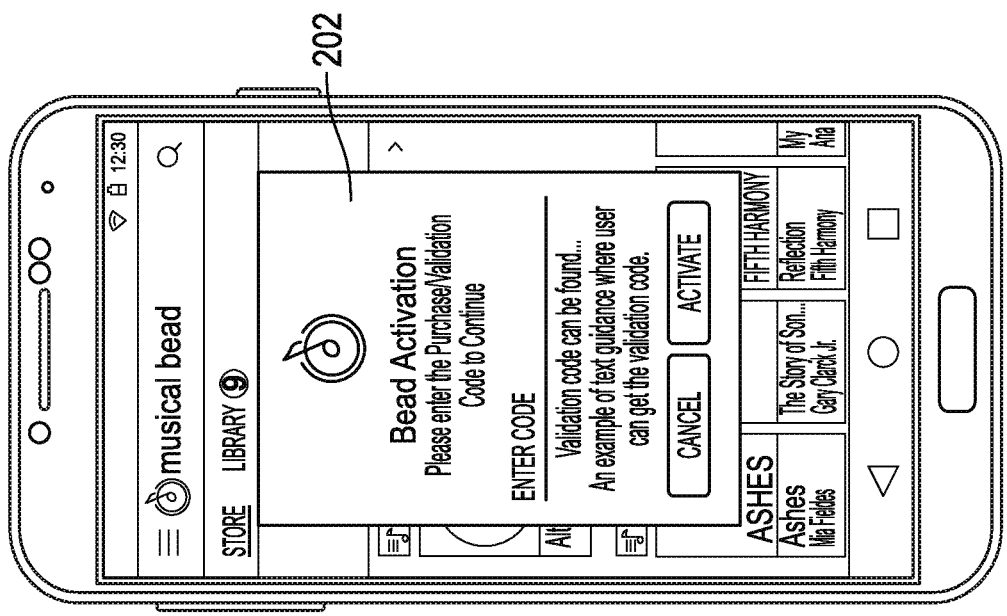

As shown in FIGS. 2A-2B, an NFC bead newly purchased will not be recognized as already being registered by the music sharing software or server system. To this end, the NFC chip must be activated or registered. When not recognized or if wishing to activate an NFC bead, the music sharing software displays a prompt in the form of an activation screen 202 as shown in FIG. 2A. Activation or registration is accomplished by manually entering a purchase code, which is preferably supplied separate from the NFC bead itself. The purchase code and NFC ID are transmitted to the server system where it is compared to a database of security pairs. Once the purchase code and NFC ID are authenticated, the server system notifies the music sharing software loaded on the NFC enabled device and permits downloading of purchased music files into long term memory within the NFC enabled device for playing anytime. As shown in FIG. 2B, the music sharing software instructs the graphical user interface to display a successful validation screen 204. In some embodiments, the successful validation screen 204 will display a graphic corresponding to the purchased music file or playlist.

Once downloaded to the NFC enabled device, music files can be added to a library of music files, which permits the library to be arranged or sorted according to music file identifiers, such as artist, album, song, genre and other identifiers known in the electronic arts. As shown in FIG. 2C, once downloaded the music player permits playing the music files and when playing a music file a corresponding music file screen 206 is preferably displayed through the graphical user interface. The music player module contains conventional functions such as play, stop, pause, fast forward, reverse, and others. In preferred embodiments the music files are provided in a format that prevents play in different audio players.

Figure 2D:
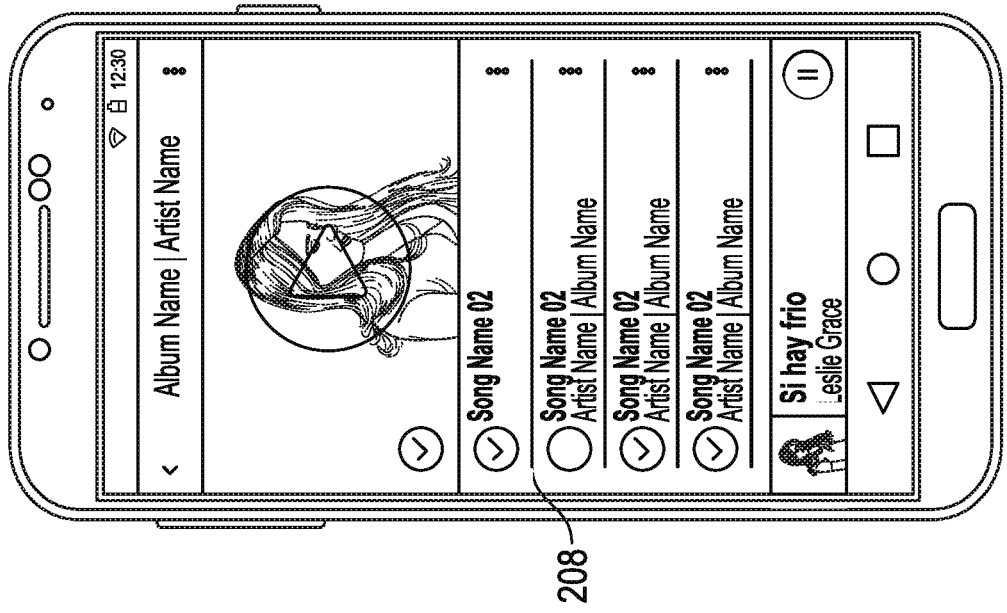
Figure 2C:
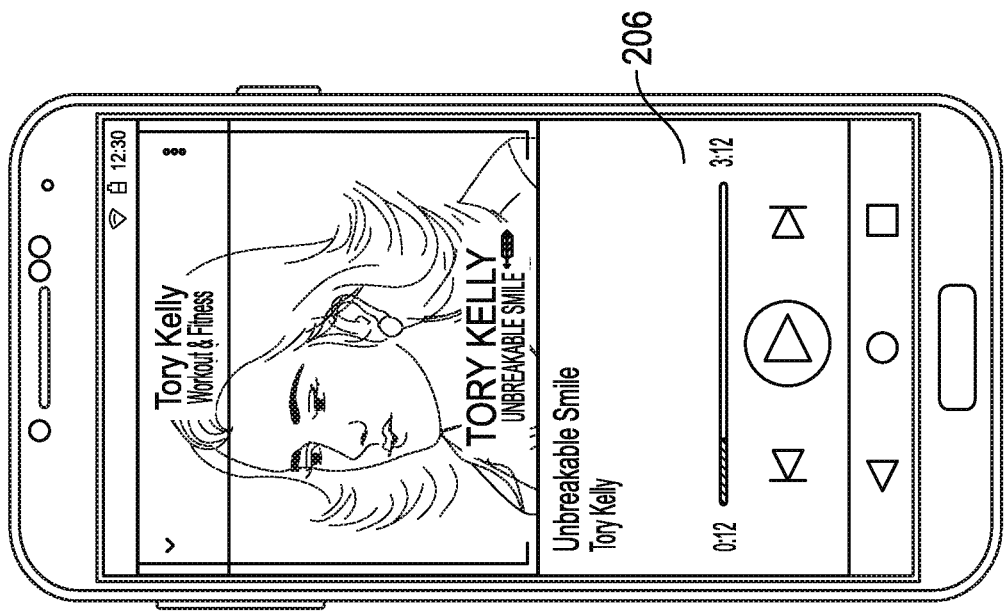

As shown in the playlist generation screen 208 of FIG. 2D, the music sharing software permits the user to select from all music files within the library to generate a playlist. Identifying files to add to a playlist can be performed by selecting or deselecting indicators for each music file as shown in FIG. 2D throughout the music library. Once all desired songs are selected the user can change the order of music files if desired and can select an option to generate the playlist when ready. Generating the playlist includes identifying each song and optionally its order and writing the data as a database file. Database population itself can be performed by placing files in a data file according to predetermined formats. In some embodiments, this generated database file is assigned to the playlist as the playlist ID. This approach permits later decoding of the playlist directly from the playlist ID itself for sharing through the server system, such as for music files. In other embodiments a random data string generator generates a data string of numbers, letters and symbols, which provides a shorter data string and thus may be preferred when generating large playlists.

Once a playlist ID is assigned to the playlist the software can prompt the user to sync the NFC bead, which writes the playlist ID to the NFC bead. An example of a sync screen 210 is shown in FIG. 2E. When syncing to the NFC bead, the NFC ID corresponding to the NFC bead and the playlist ID is communicated to the server system where it can be saved in a database for later authentication for streaming music files. The music sharing software can also upload a playlist database file separate from the playlist ID to further identify the music files assigned to the playlist ID.

Figure 2F:
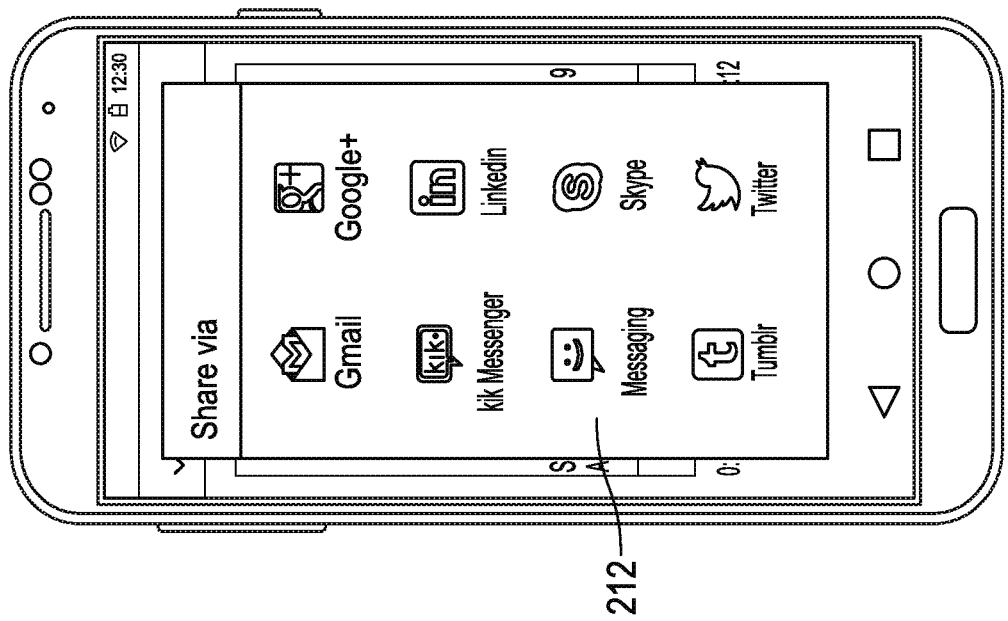
Figure 2E:
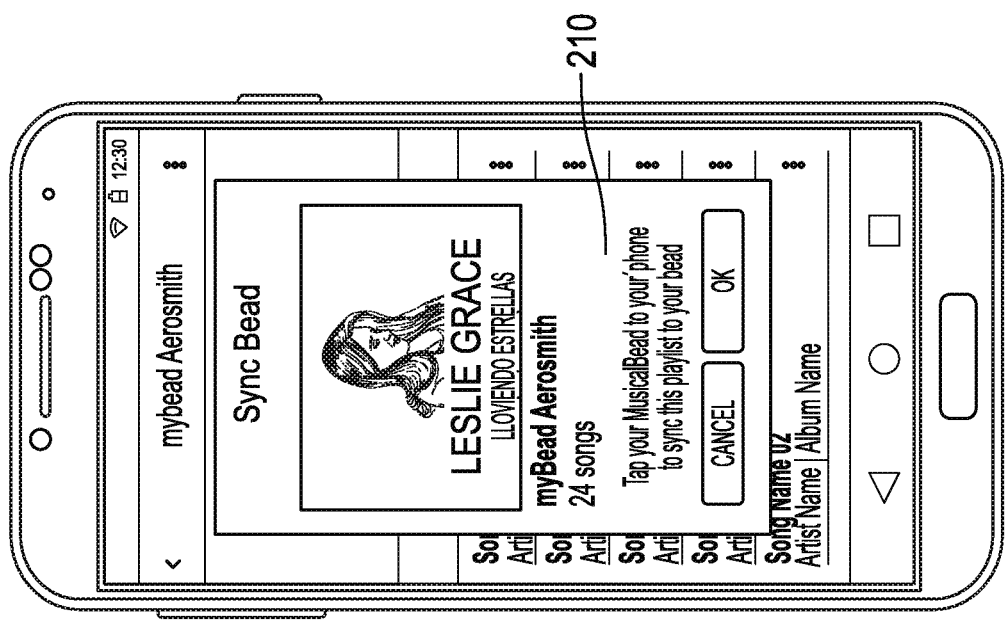

The music sharing software also permits sharing of music files through social media platforms as shown on the social media screen 212 in FIG. 2F. Nonlimiting examples include an email program, a messenger program, a business network program, a social network program and others. In some embodiments the playlist is generated and provided to the server system, which generates an access code permitting temporary streaming or playing of the music file without downloading the music file into the long-term memory of subsequent NFC enabled devices. The access code can then be transmitted to the social media platform by the music sharing software or the server system.

Figure 2G:
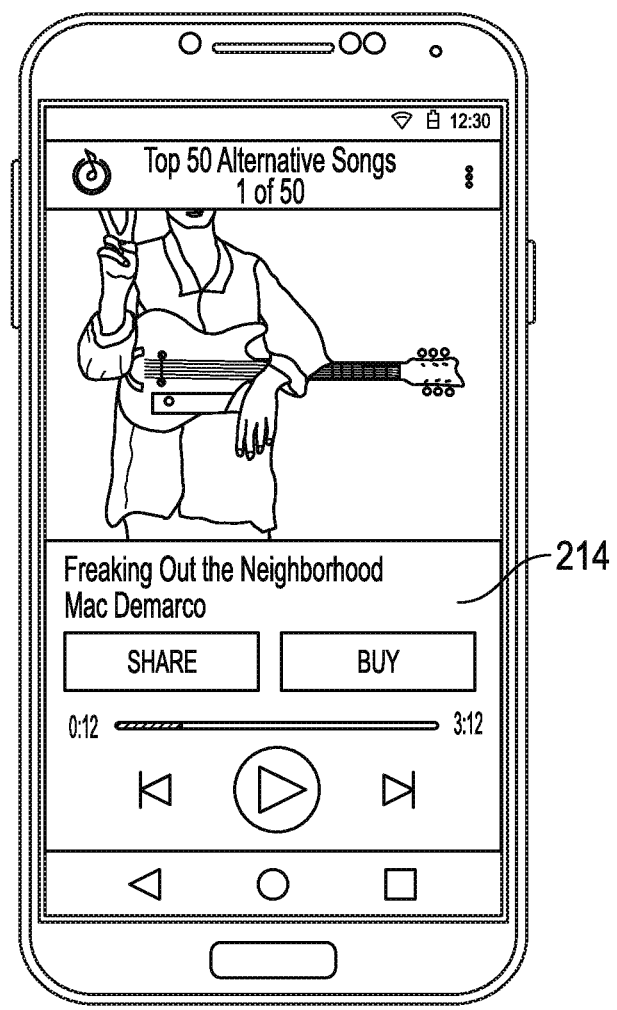

As shown in FIG. 2G, the music sharing software together with the server system permits music files to be previewed, then shared temporarily or purchased.

Example 1: Purchasing Music Files Using NFC Technology

Referring to FIGS. 1A-B, among the inventions disclosed herein, methods for transferring music files using near field communication (NFC) to an initial purchaser are provided. An exemplary method includes: providing an NFC chip 102 with an NFC identifier (ID) unique to the NFC chip 102; assigning a group of music files to an NFC ID and purchase code pair, wherein the NFC ID and purchase code pair are stored on a server system 114 configured to access and transfer the music files; reading the NFC ID from the NFC chip 102 using an NFC enabled device 112a loaded with music sharing software configured to play the music files; entering the purchase code into the NFC enabled device 112a; authenticating the NFC ID and purchase code pair received by the NFC enabled device 112a through communication with the server system 114; and if authenticated, registering the music files to a user of the NFC enabled device 112a. Once the music files are registered, the user is permitted to download the music files into the long-term memory of the NFC enabled device 112a for playing anytime or may stream or play the music files by saving the music files to a registered account and streaming or playing the music files from the account. Further, once registered the user may designate other users for temporary streaming or playing of the music files without permission for downloading into long-term memory, which is regulated and monitored by sever system 114.

Figure 3:
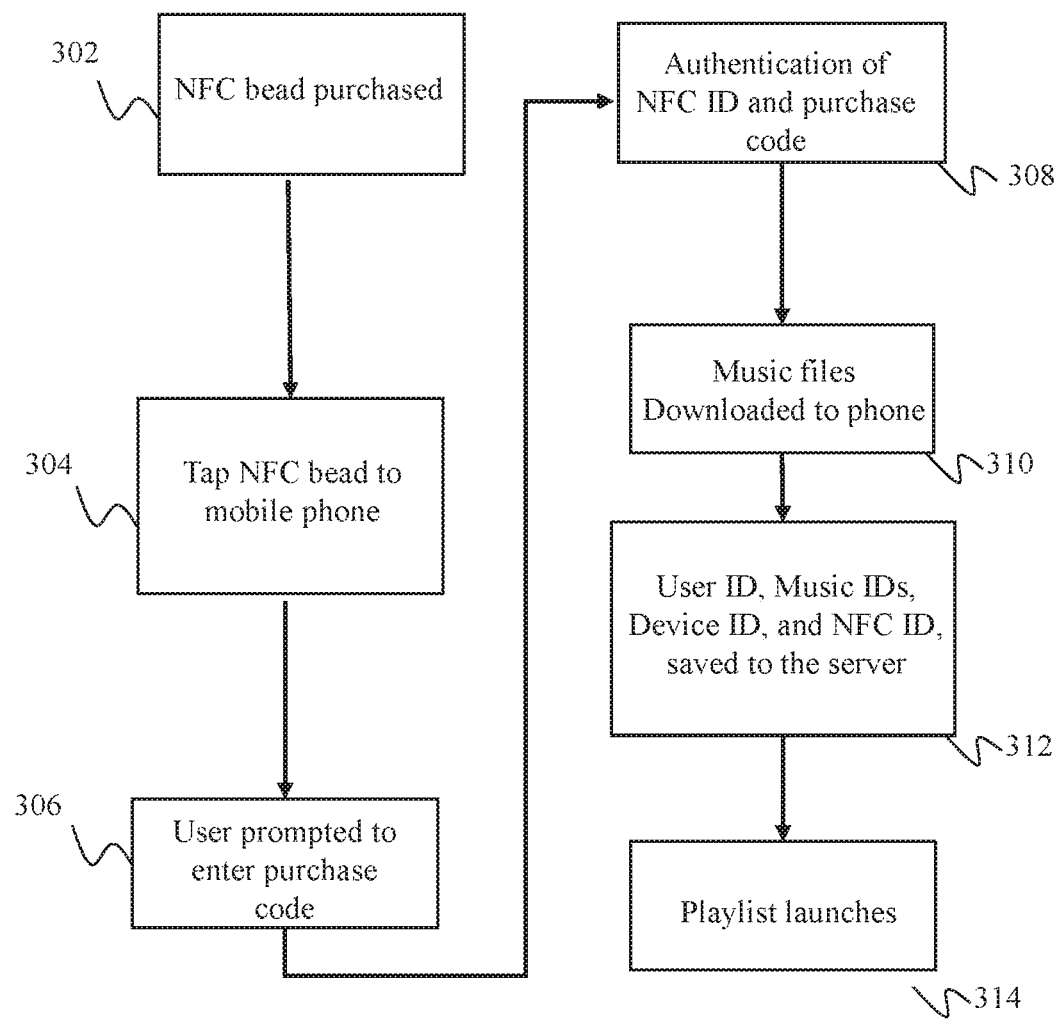
FIG. 3 is a flowchart depicting a method for purchasing music files using a newly purchased NFC bead of FIG. 1.

FIG. 3 is a flowchart demonstrating an exemplary embodiment demonstrating the purchase of a music file through the use of a housed NFC chip using an NFC enabled device prior to sharing. In this example, the housed NFC chip is embodied as an NFC bead having a spherical polymer shell around the NFC chip and the NFC enabled device is a mobile phone.

Step 302 represents the initial purchase of the NFC bead, which is most often through a music retailer. The bead is pre-loaded with an NFC ID for identification and a purchase code is provided separately in the packaging. In Step 304 the bead is tapped to the purchaser's mobile phone to initiate communication with the music sharing software. If the mobile phone already has the music sharing software, then the software launches. If the music sharing software is not yet installed on the mobile phone, the mobile phone is directed via a web browser to a web site where the music sharing software can be downloaded onto the mobile phone then opened. A series of conditional decisions to accomplish Step 304 can be by executable code consistent with current approaches for opening and retrieving software programs used in the software industry. For example, executable programming can direct a browser to a variety of suppliers that provide software applications such as like Google Play or the Apple App Store. Directing a browser to such sites and downloading software applications is well within the ability of one of ordinary skill in the art to which the invention belongs.

In Step 306 the music sharing software identifies the NFC ID as not registered and therefore requires entry of a purchase code using the graphical user interface. Verifying registration can be performed automatically by communication with the system server or can be manually instructed. In Step 308, the server authenticates the NFC ID and purchase code by comparing the data strings for each to a database of valid combinations. The server queries its database, and if the NFC ID and purchase code match, the combination is deemed authentic and the server approves the music files for download. The purchaser might then see a validation message on the graphic user interface. If the combination of NFC ID and purchase code are not found in the database the music files are not downloaded. In some embodiments, the user is provided with an option of purchasing the music files if the combination of NFC ID and purchase code are not found in the database.

In Step 310, after authentication of the NFC ID and purchase code, the purchased music files are downloaded for long-term memory to the user's NFC enabled mobile phone. In some embodiments the music files are stored on the mobile phone and a copy is saved to a user's online account, which can be generated using methods well known in the art to which the invention belongs. In an alternate embodiment, the music is not downloaded onto the user's mobile phone, but rather assigned to an online user's account and linked in a way that allows for unlimited streaming from the music's storage location to the mobile phone. With fast Internet, the streaming option allows a user to save storage space on the mobile phone.

In Step 312 a user ID unique to the user, a music ID associated with the music files purchased by the user, a device ID unique to the mobile phone and the NFC ID associated with a particular NFC bead are stored as a data set to a database accessible by the server, which can be used as a backup feature or for sharing applications. The purchase code can also be saved. By storing user IDs the music sharing software and server system can interactively track the ownership of music files, devices, and NFC chips. By storing music IDs, the music sharing software and server system can maintain a listing of purchased or owned music files. By storing device IDs the music sharing software and server system can authenticate a user's mobile phone and all other devices that play music files owned by the user, such as tablet computer, laptop computer, network media player (DVD player, television) as well as others. By storing an NFC IDs, the music sharing software and server system can track the exchange, sharing and transfer of music files between NFC enabled devices. The identifiers themselves are typically in the form of a data string with a plurality of letters, numbers and symbols. In some embodiments the purchase code is saved to facilitate the transfer of ownership of one or more music files.

In Step 314, the music sharing software launches the music player and the playlist plays. In preferred embodiments the music files are provided in an encrypted form or using an extension that prevents playing in other media players. As with other media players the music sharing software permits playing music files in a prearranged order, random or shuffled order, permits fast forward, rewind, skipping forward and backward, pausing, stopping, sampling, and other functionality found in audio media players.

Example 2: Previewing Music Through Social Media

Among the features provided in the music sharing software is the temporary sharing of a preview file by providing an access link or portal to a music file for previewing without providing permission for downloading the music file into long term memory. An overview of an exemplary approach is summarized in FIG. 4. For example, once a purchaser has purchased the music file, a playlist can be generated from one or more music files for sharing with subsequent users of the music sharing software.

In some embodiments, the preview music file is shorter than the originating music file, and the properties defining the length can be updated by the server. In some embodiments, preview music files are played by remote access or streamed and thus only permitted when the receiving user is connected to the Internet. Preferably, access to shared preview music files by subsequent users will not be possible offline and is temporary.

In Step 402, a playlist is generated from one or more purchased music files. This can be accomplished on the user interface of the NFC enabled device by navigating to desired music file and selecting the desired music files for sharing. After which, a playlist is generated and a playlist ID assigned. The user then executes a sharing command. The user also chooses the platform to deliver playable temporary access to the music files. Among these include electronic mail, text messaging, social media and others.

The sharing command communicates the playlist ID to the server system, which generates an executable access link to a remote site, which permits temporary playing of music files from the playlist.

In Step 404, the executable access link is sent to a subsequent user using the selected platform. The access link can be in an HTTP format or in another link format that serves to connect a subsequent NFC enable device to the server, such as through a secure portal, for playing the music file via the Internet.

In Step 406, the subsequent user receives the link and is able to play the music file under time constraints or repetition constraints regulated by the system server.

Example 3: Sharing Music Playlists Using NFC Technology

Referring to FIGS. 1A-B, the invention provides methods for sharing playlists generated from purchased music files through the pairing and authentication of an NFC ID and playlist ID. As an example the invention provides a method of sharing a music playlist using near field communication (NFC), the method including: assigning a playlist Identifier (playlist ID) to a playlist of music files; receiving an NFC Identifier (NFC ID) from an NFC chip 102 using an NFC enabled device 112*a*; writing the playlist ID to the NFC chip 102 using the NFC enabled device 112*a*; storing the NFC ID and playlist ID to a server system 114, where the server system 114 has an accessible copy of the music files encoded in the playlist ID for playing or streaming; receiving the NFC ID and playlist ID from the NFC chip 102 using a subsequent NFC enabled device 112*b*; authenticating the received NFC ID and playlist ID on the subsequent NFC enabled device 112*b* with the server system 114; and if authenticated, playing or streaming the copy of the music files through the subsequent NFC enabled device 112*b*. The playlist ID can be generated and assigned by the NFC enabled device 112*a* for writing to the NFC chip 102 and for transmitting to the server system 114. Alternatively, the server system can generate and assign the playlist ID then provide the playlist ID to the NFC enabled device 112*a* for writing to the NFC chip 102.

Figures 4, 5:
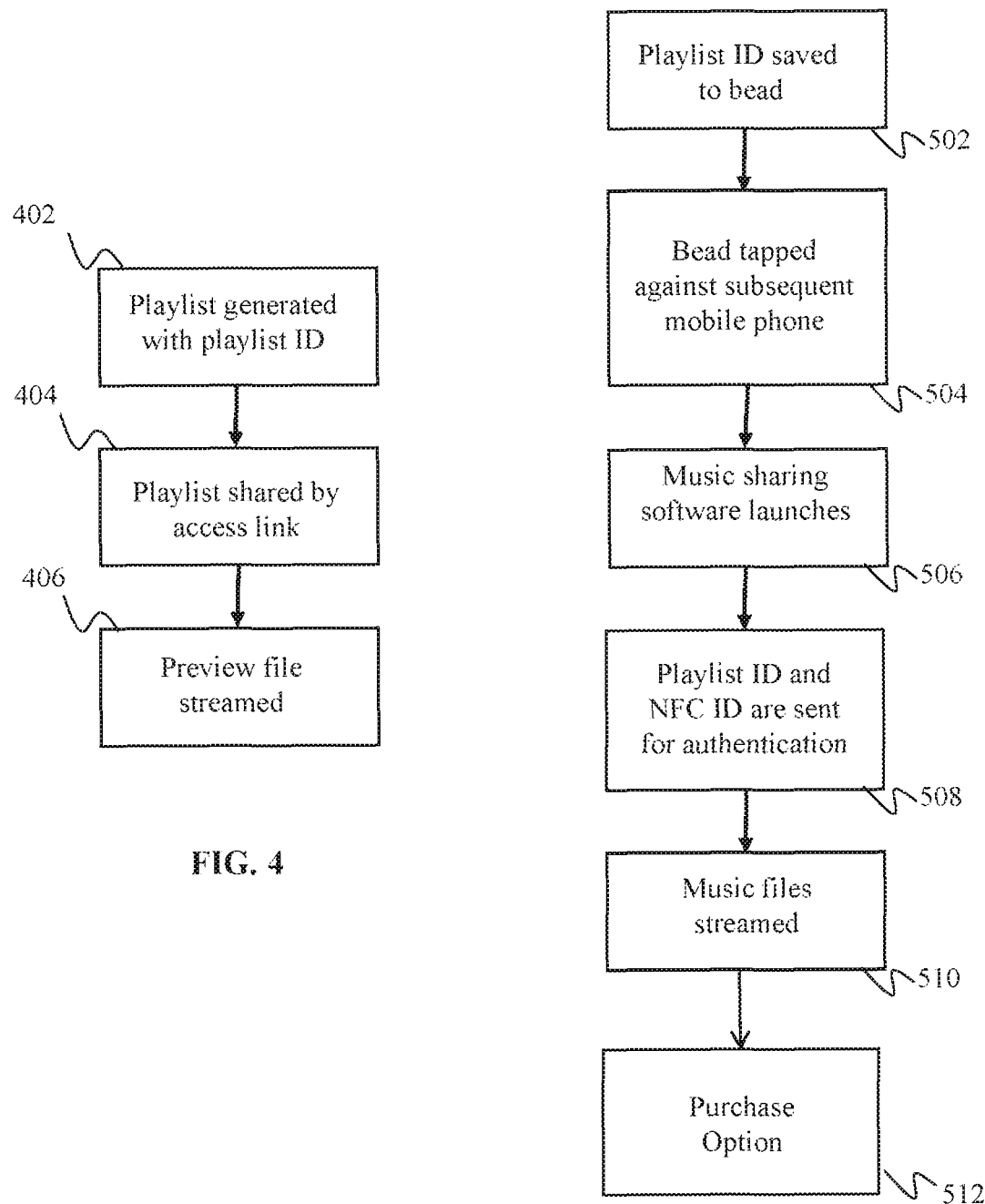
FIG. 4 is a flowchart depicting a method for sharing access to a playlist by providing a temporary access portal to an account for temporary playing of music files within a playlist.
FIG. 5 is a flowchart depicting a method for sharing temporary access to a playlist between NFC enabled devices by providing a playlist ID on the NFC chip of FIG. 1 for authentication by a system server and an option to purchase music files within the playlist.

FIG. 5 provides an example where a housed NFC chip embodied as an NFC bead is shared between users with NFC enabled devices embodied as mobile phones to temporarily share a playlist of music files.

In Step 502, a playlist is generated, and an assigned playlist ID is saved to the bead using the music sharing software. The playlist can be the same as one previously purchased or can be a custom playlist defined by assigning one or more songs to the playlist. The sharing program prompts the user to tap an NFC bead to the mobile phone and a prompt confirms the playlist ID is written to the NFC bead. Prior to or during this process the NFC ID associated with the NFC bead is recorded by the music sharing software and paired with the playlist ID. The NFC ID and playlist ID are uploaded to the server system.

In some embodiments the Playlist ID is a data file identifying each of the music files contained in the playlist. This can be performed by grouping a series of music track identifiers (track IDs) also referred to herein as "music IDs" or "music file IDs" in a data string or data matrix, where each track ID is associated with a music file and is provided in a readable order according the order in the playlist. The playlist ID and NFC ID are transmitted to the server system for entry into the database where they remain for later retrieval for an authentication query. Preferably, the server system has access to authorized copies of the individual music files through a separate license agreement such that the music files themselves do not need to be uploaded to the server system by the mobile phone. Since the playlist ID can identify the music files within the playlist, the server system can simply retrieve the authorized copy for playing or streaming after authentication of the NFC ID and playlist ID. Although not preferred, the invention also encompasses embodiments where the music files themselves are uploaded to the server system In an alternative embodiment, the playlist ID is a data string generated from a random data string generator program within the music sharing software, which generates a random string of characters having a mixture of numbers, letters and symbols. In addition, the music sharing software saves the series of track identifiers (track IDs) in a playlist data file, where each track ID is associated with a music file and is provided in a readable order according the order in the playlist. The playlist ID, NFC ID and playlist data file are transmitted to the server system for entry into the database where the playslist ID and NFC ID remain for a later authentication query and the playlist data file for identifying the track IDs for playing the music files after authentication. Preferably, the server system has access to authorized copies of the individual music files through a separate license agreement such that the music files themselves do not need to be uploaded to the server system by the mobile phone. Since the playlist ID can identify the music files within the playlist, the server system can simply retrieve the authorized copy for playing after authentication of the NFC ID and playlist ID. Although not preferred, the invention also encompasses embodiments where the music files themselves are uploaded to the server system.

In Step 504, the bead is tapped to a subsequent user's mobile phone to initiate near field communication with the bead and in Step 506 the music sharing software on the subsequent user's mobile phone reads the received file to begin the process of authentication. This can be performed automatically by the near field communication between the NFC bead and the mobile phone or the music sharing software can be launched prior to near field communication by separately launching the music sharing software using the graphical user interface of the mobile phone. Naturally, the if the music sharing software is not yet installed on the mobile phone, then a browser can be directed to a web site for downloading the music sharing software onto the mobile phone. This series of conditional decisions can be accomplished by executable code preloaded onto the bead, or it can be accomplished by code present on the mobile device as is known in the art to which the invention belongs.

In Step 508, the music sharing software retrieves both the NFC ID and the playlist ID and transmits them to the server system for authentication. The server system compares the NFC ID and playlist ID to the database of security codes for authentication. If authenticated, the playlist is permitted to stream temporarily on the mobile phone as provided in Step 510.

The step of streaming or playing music files can be performed consistent with the embodiments to which the playlist was initially provided by the server and consistent with the music sharing software.

In embodiments where the playlist ID is a data file identifying each of the music files contained in the playlist. Track IDs associated with the music files can be parsed from the playlist ID on the server system, a listing of available music files can be transferred to the mobile phone for display on an interactive user interface for selection, and once selected the corresponding music file can be retrieved by the server system and streamed consistent with any license agreements. Alternatively, the music sharing software can parse the track IDs from the playlist ID retrieved from the NFC bead, present the listing of track IDs to the user through a selectable user interface for selection and once selected transmit the order to the server system for playing or streaming without downloading the music files to long-term memory.

In embodiments where the playlist ID is a data string generated from a random data string generator program within the music sharing software, the playlist data file previously provided to the server system is parsed for the available track IDs and the listing of track IDs are provided to the mobile phone for display on an interactive user interface for selection, and once selected the corresponding music file can be retrieved by the server system and streamed consistent with any license agreements.

In some embodiments, access to the playing music is limited by a predetermined time, such as a predetermined number of hours. Regulating access by the number of hours can be performed by providing a timer program within the server system that times access to the playing music and is configured to stop access once a predetermined time limit is met. Nonlimiting examples of such time limits include a time limit selected from the group consisting of 1 hour, 2 hours, 3 hours, 4 hours, 5 hours, 6 hours, 7 hours, 8 hours, 9 hours, 10 hours, 12 hours, 18 hours, 24 hours, 36 hours, 48 hours, 72 hours, 96 hours, 120 hours, 144 hours, 168 hours, and others. In other embodiments access to the playable music is limited by a predetermined number of plays, where the server system counts repetitions of one or more music files and compares the count to a predetermined limit. Non-limiting examples of such repetitions include from 1-5 repetitions per music file or from 1-5 repetitions of the playlist. In still another embodiment, access to the playable music is limited by the number of times the same mobile phone contacts the server system to begin playing the music. Non-limiting examples of such repetitions include from 1-5 repetitions of contacting the server system.

In Step 512, the user is presented with an option to purchase the music files in the playlist. This can be accomplished using conventional shopping cart and checkout programming on the server system as known in the online retail arts. In some embodiments, the purchase option interfaces with another music retailer.

Example 4: Transferring Ownership of Music Files to a Subsequent User from an Original Purchaser Using NFC Technology Referring to FIGS. 1A-B, in some embodiments, the invention provides the ownership transfer of music originally associated with a NFC bead 110 using NFC technology and the purchase code. In an exemplary method the invention includes a method of transferring music files between near field communication (NFC) enabled devices 112*a*, 112*b*, the method including: providing an NFC enabled device 112*a* with a library of music files; registering an NFC ID, a purchase code, and music files from the library of music files to a user account on a server system 114; reading the NFC ID from an NFC chip 102 using a subsequent NFC enabled device 112*b*; entering the purchase code into the subsequent NFC enabled device 112*b* without use of the NFC chip 102; authenticating the NFC ID and purchase code on the server system 114; requesting permission to transfer the music files from the user's account to a different user's account; and if approved, deleting the music files from the library of music files; registering the purchase code and music files to the different user's account; and downloading the music files to the subsequent NFC enable device 112*b*. Another exemplary method is demonstrated in FIG. 6, which follows the transfer of ownership of music files after an initial purchase and the registration of the bead ID, purchase code and user ID.

In Step 602, an original purchaser of music files transfers an NFC bead to a subsequent user. In addition, the original purchaser provides the subsequent user with the original purchase code or a newly generated purchase code. The purchase code is preferably not loaded on the NFC bead but instead is provided separately.

In Step 604, near field communication between the NFC bead and the mobile phone is initiated when the NFC bead nearly taps against the mobile phone. To this end, the subsequent user taps the NFC bead against a subsequent mobile phone. If the mobile phone already has the music sharing software, then the software launches. If the music sharing software is not yet installed on the mobile phone, the a browser is directed to a web site where the music sharing software can be downloaded onto the mobile phone then launched as with the embodiments above. Alternatively, the music sharing software can be launched followed by near field communication with the NFC bead. The near field communication transfers the bead ID to the mobile phone.

In Step 606 the subsequent user chooses to enter the purchase code associated with the bead ID. In some embodiments this is done by choosing an option in the software to purchase music files associated with a bead ID, which prompts the user to enter the purchase code. In other embodiments, the bead ID is transmitted to the server system and in response the server system, which has been notified by the original purchaser that the music files are to be transferred, prompts the subsequent user for the purchase code.

In Step 608, the bead ID and purchase code are transmitted to the server system for authentication. The server system queries its database, and if the bead ID and purchase code are found in the database, a request is sent from the server system to the original purchaser to validate or authenticate the transfer of the music files as shown in Step 610. This can be accomplished by sending an authorization request to the music sharing software on the original purchaser's mobile phone to verify the intent to transfer music files to the subsequent user. The implication of transfer is that the original purchaser relinquishes the ability to play the music files. To ensure there is only one registered owner at a time, the music files or anytime playability of the music files on the original purchaser's NFC enabled device or original purchaser's account can be revoked or deleted prior to completing ownership transfer of the music files to a new owner. In some embodiments after transfer the purchaser is able to stream a preview file associated with the music files. In some embodiments additional security information is required to complete the transfer of music files to protect against theft of music files from a stolen phone, such as additional security questions as known in the art. On the other hand, if the NFC bead and purchase code have been lost or stolen from the original purchaser, the permission request allows the original purchase to take subsequent action following discovery of the missing NFC bead.

In Step 612, the music files are downloaded to the subsequent user's mobile phone.

In Step 614, the transferred music files are deleted from the original purchaser's library of available music. In some instances, the original purchaser is able to preview the music files by playing a shortened version from the server system. Deleting the music files from the original purchaser's phone can be performed before permitting anytime play by the new owner to ensure there is at most one owner at all times.

Figure 7:
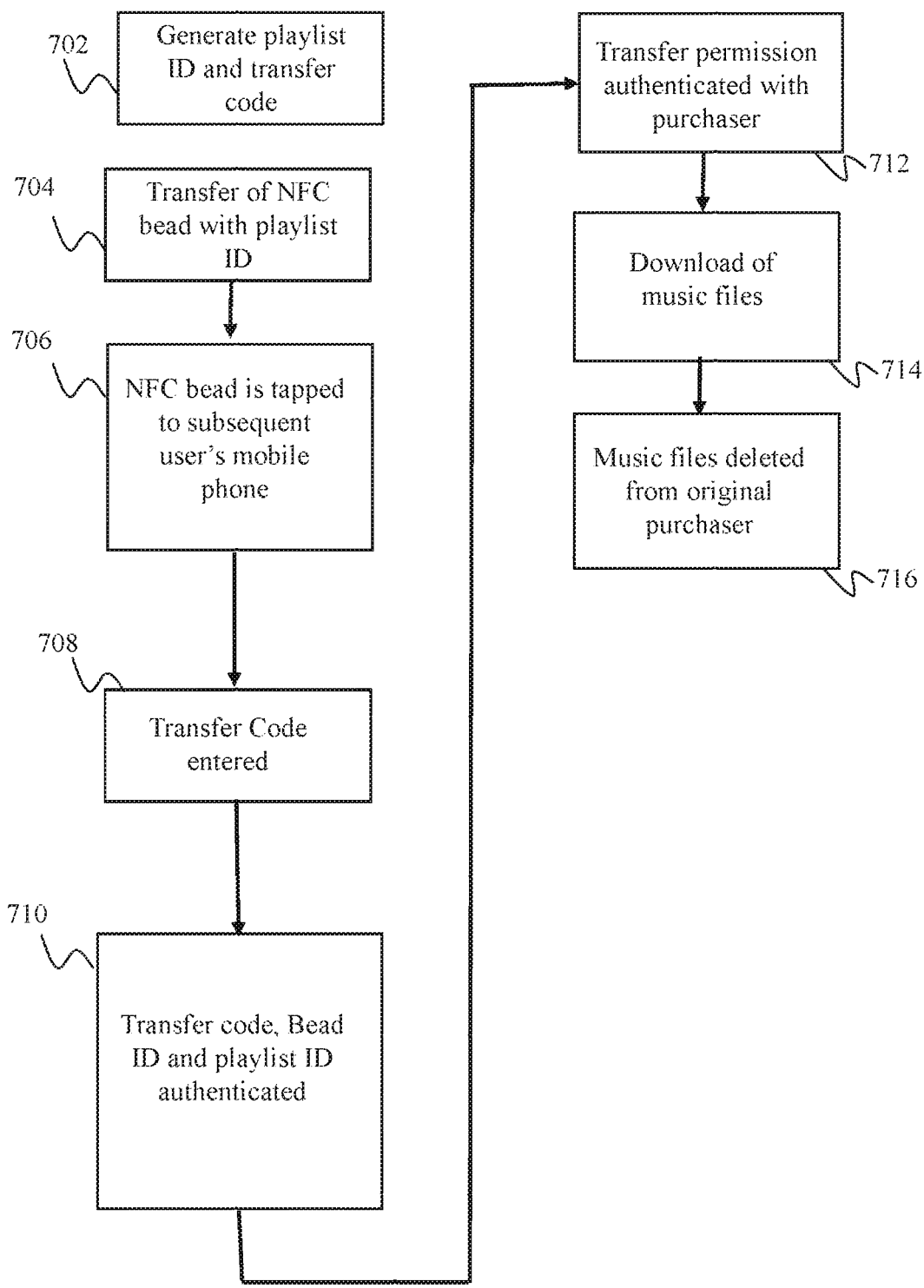
FIG. 7 is a flowchart depicting the transfer of ownership of a generated playlist between NFC enabled devices.

Example 6: Transferring Ownership of Playlists to a Subsequent User Through Use of NFC Technology and a Transfer Code Referring to FIGS. 1A-B, the invention also provides a method of transferring ownership of custom playlists through the use of NFC technology and a transfer code. In an exemplary embodiment, the invention provides a method of transferring music files between near field communication (NFC) enabled devices 112*a*, 112*b*, the method including: providing an NFC enabled device 112*a* loaded with a library of music files and an NFC chip 102 encoded with an NFC identifier (NFC ID); generating a playlist of music files from the library of music files; assigning a playlist ID, a transfer code, and the NFC Identifier to the playlist on a server system 114; saving the playlist ID to the NFC chip 102; receiving the playlist ID from the NFC chip 102 using a subsequent NFC enabled device 112*b*; entering the transfer code into the subsequent NFC enabled device 112*b*; authenticating the NFC ID, playlist ID and transfer code on the server system 114; sending a permission request from the server system 114 to the NFC enabled device 112*a* to confirm transfer of the music files to a subsequent user; and if approved deleting the music files from the library of music files; and registering the music files to the subsequent user's account, wherein the registration updates ownership of the music files. A related exemplary embodiment is demonstrated in FIG. 7, which follows the transfer of a custom playlist using NFC technology. The housed NFC chip is embodied as an NFC bead and the NFC enabled devices are embodied as mobile phones.

In Step 702, a collection of music files are grouped to form a playlist and a playlist data file providing the identification and order of the music files is generated. A playlist ID is generated using a random data string generator. The original purchaser having an option to share or transfer entire ownership of the playlist choses to transfer. The music sharing software generates a transfer code for initiating transfer. The playlist ID is loaded onto the NFC bead. The playlist ID, bead ID, playlist data file and transfer code are uploaded to the server system.

In Step 704, the original purchaser of music files physically transfers the NFC bead written with the playlist ID to a subsequent user and provides the user with the transfer code. The transfer code is a code that allows a set of files to be downloaded onto an NFC enabled device. Without a transfer code the music sharing software is only able to ultimately stream the play list or purchase the music files through the music sharing software. Without the transfer code, the downloading of complete music files cannot occur.

In Step 706, near field communication between the NFC bead and the mobile phone is initiated by tapping the NFC bead against the mobile phone. If the mobile phone already has the music sharing software, then the software launches. If the music sharing software is not yet installed on the mobile phone, the mobile phone is directed via a web browser to a web site where the music sharing software can be downloaded onto the mobile phone then opened. A series of conditional decisions to accomplish the above can be by executable code preloaded onto the bead's NFC chip, or it can be accomplished by code present on the mobile phone consistent with approaches for opening and retrieving software programs used in the software industry. Alternatively, the music sharing software can be launched prior to activating near field communication with the NFC bead.

In Step 708 the music sharing software prompts the user for entry of the transfer code that is associated with the NFC bead and the playlist ID. In some embodiments the prompt is initiated after transferring the NFC ID and playlist ID to the server system, which during validation reveals the presence of a transfer code in the database thereby suggesting the music files are to be transferred. In other embodiments, a file transfer option is among the menu options in the music sharing software from which the user can select.

In Step 710, the transfer code is provided to the server for authentication. The server queries its database, and if the bead ID, playlist code and transfer code match those of the database, the original purchaser is notified of the transfer request. In Step 712 a request is sent from the server system to the original purchaser to validate or authenticate the transfer of the music files as shown in Step 712. This can be accomplished by sending an authorization request to the music sharing software on the original purchaser's mobile phone to verify the intent to transfer music files to the subsequent user. The implication of transfer is that the original purchaser relinquishes the ability to play transferred music files from the playlist. In some embodiments after transfer the purchaser is able to stream a preview file associated with the music files. In some embodiments additional security information is required to complete the transfer of music files to protect against theft of music files from a stolen phone, such as additional security questions as known in the art.

After permission is granted to transfer the music files, the server system permits the download of the music files to the mobile phone as summarized in Step 714.

In Step 716, the transferred music files are deleted from the original purchaser's library of available music. In some instances, the original purchaser is able to preview the music files by playing a shortened version from the server system.

Example 7: Retrieving a Lost Purchase Code

Figure 8:
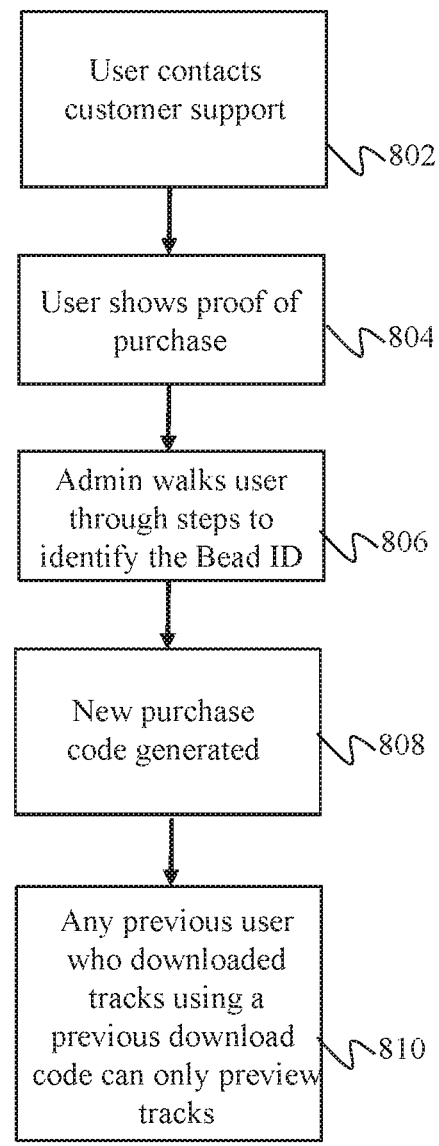
FIG. 8 is a flowchart depicting retrieval of a lost purchase code.

Referring to FIGS. 1A-B, Situations might arise in which a user, being the owner of a NFC bead 110, loses the purchase code associated with the bead 110, which in some embodiments can prevent downloading music files associated with the NFC bead 110. In some embodiments, the loss of a purchase code can prevent the transfer ownership of the NFC bead 110 and/or its associated tracks to a subsequent NFC enable device 112*b* or user. The flowchart in FIG. 8 shows an example of a process that a user can go through in order to recover a missing purchase code.

Figure 6:
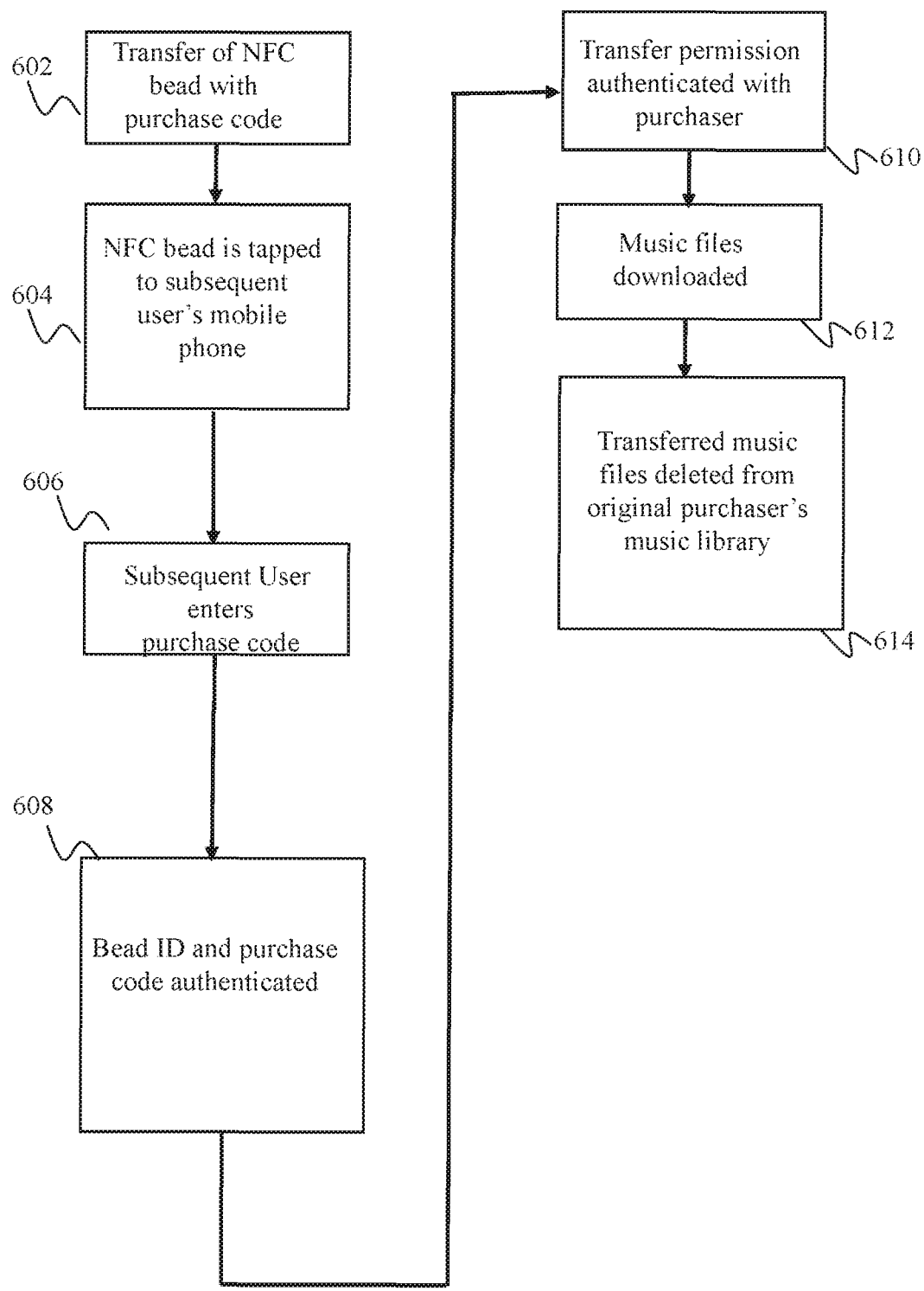
FIG. 6 is a flowchart depicting the transfer of ownership of music files from an originally purchased playlist between NFC enabled devices.

In Step 802 of FIG. 6, the user contacts customer support about the missing purchase code. This step can be accomplished through various methods, such as through a messaging or email feature within music sharing software, phone, email, online chat, text message, in person, or others.

In Step 804, the purchaser presents proof of purchase. The proof of purchase can be in the form of a receipt number present on a receipt issued with the purchase of a bead. In such an embodiment the receipt number will be stored in the database on the server system. In step 806, every time a customer support representative ("Admin") enters a receipt number into the database, the server system will check to ensure that the receipt number was not previously reported, so as to prevent fraud.

In some embodiments the proof of purchase is in the form of a Bead ID. In Step 806, the customer support representative shows the user how to locate the Bead ID. If user had not yet activated the NFC bead, then the user will be able to find the Bead ID on the product packaging. If the user has activated the NFC bead, then the Bead ID can be retrieved through the music sharing software using additional security questions previously stored.

In Step 808, the customer support representative disables the original purchase code and/or Bead ID and generates a new purchase code and/or Bead ID. These changes can be made by the representative directly accessing the database present on the system server and manually modifying values. The process can also be performed indirectly through a mechanism that checks for inadvertent errors by the representative. Optionally, backup copies of previous database values can be created.

In Step 810, the server disables access to music files by any previous user who might have downloaded or linked to the tracks through a previous purchase code and/or User ID. This step serves to cut off access by someone who might have gained unauthorized access to the purcase code and/or Bead ID, and transferred ownership of the music files without authorization.

It will be apparent to those skilled in the art to which the invention belongs that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

What is claimed is:

1. A method of sharing music files using near field communication (NFC), the method comprising:
    a) storing a playlist of music files on a server system and assigning the music files or the playlist to an NFC identifier (NFC ID) on the server system;
    b) receiving the NFC ID from an NFC chip using an NFC enabled device and authenticating the received NFC ID with the server system using the NFC enabled device; and if authenticated,
    c) permitting the NFC enabled device to stream the stored music files, wherein the streaming is limited to a predetermined time or a predetermined repetition of play of one or more of the music files within the playlist.

2. The method of claim 1, wherein the playlist is generated by a different NFC enabled device and transferred to the server system.

3. The method of claim 2, wherein the different NFC enabled device generates a playlist identifier (playlist ID) for association with the playlist and transfers the playlist ID to the server system.

4. The method of claim 3, wherein the playlist ID is received from the NFC chip using the NFC enabled device.

5. The method of claim 1, wherein the NFC chip is housed in a polymer to form an NFC bead.

6. The method of claim 1, wherein the method further comprises providing a selectable option to purchase a downloadable copy of one or more of the music files.

7. A method of sharing music files using near field communication (NFC), the method comprising:
    a) storing a playlist of music files on a server system and assigning the music files or the playlist to an NFC identifier (NFC ID);
    b) receiving the NFC ID from an NFC chip using an NFC enabled device and authenticating the received NFC ID with the server system using the NFC enabled device; and if authenticated,
    c) permitting the NFC enabled device to play a copy of the music files through the subsequent NFC enabled device; and
    d) presenting an option to purchase one or more of the music files using the subsequent NFC enabled device.

8. The method of claim 7, wherein the playlist is generated by a different NFC enabled device and transferred to the server system.

9. The method of claim 8, wherein the different NFC enabled device generates a playlist identifier (playlist ID) and transfers the playlist ID to the server system.

10. The method of claim 9, wherein the playlist ID is received from the NFC chip using the NFC enabled device.

11. The method of claim 1, wherein the NFC chip is housed in a polymer to form an NFC bead.

12. A method of transferring music files using near field communication, the method comprising:
    a) providing a playlist of music files in a user account within a server system, wherein the playlist is paired with a code and an NFC identifier (NFC ID);
    b) reading the NFC ID from an NFC chip using an NFC enabled device;
    c) transferring the code and NFC ID to the server system for authentication using the NFC enabled device; and if authenticated
    d) requesting permission from the user to transfer the playlist of music files from the user's account to a different user's account; and if approved
    e) deleting the playlist of music files from the user's account; and
    f) registering the playlist of music files to the different user's account.

13. The method of claim 12, wherein the NFC chip is housed in a polymer to form an NFC bead.

14. The method of claim 12, wherein the method further comprises providing a selectable option for the user to stream a copy of deleted playlist of music files.

15. A method for transferring music files using near field communication (NFC), the method comprising:
    a) providing an NFC chip with an NFC identifier (NFC ID);
    b) assigning a group of music files to a purchase code and to the NFC ID;
    c) reading the NFC ID from the NFC chip using an NFC enabled device;
    d) entering the purchase code into the NFC enabled device;

e) authenticating the NFC ID and purchase code pair received by the NFC enabled device through communication with the server system; and if authenticated,
f) registering the music files to a user of the NFC enabled device, wherein the user is permitted to play the music files on the NFC enabled device.

\* \* \* \* \*